(12) United States Patent
Eriksson et al.

(10) Patent No.: US 7,187,532 B2
(45) Date of Patent: Mar. 6, 2007

(54) DEVICE AND A METHOD FOR STABILIZING A WEB OR A FILAMENT OF FERROMAGNETIC MATERIAL MOVING IN ONE DIRECTION

(75) Inventors: Per Lennart Eriksson, Västerås (SE); Bengt Rydholm, Västerås (SE); Sven Karlsson, Västerås (SE); Magnus Hallbäck, Bromma (SE); Göte Tallbäck, Västerås (SE)

(73) Assignee: ABB AB, Vasteras (SE)

( * ) Notice: Subject to any disclaimer, the term of this patent is extended or adjusted under 35 U.S.C. 154(b) by 350 days.

(21) Appl. No.: 10/343,158

(22) PCT Filed: Aug. 10, 2001

(86) PCT No.: PCT/SE01/01734

§ 371 (c)(1),
(2), (4) Date: Jan. 29, 2003

(87) PCT Pub. No.: WO02/14192

PCT Pub. Date: Feb. 21, 2002

(65) Prior Publication Data
US 2005/0274435 A1 Dec. 15, 2005

(30) Foreign Application Priority Data
Aug. 11, 2000 (SE) .................................... 0002891

(51) Int. Cl.
*H01H 47/00* (2006.01)
(52) U.S. Cl. ...................... 361/144; 361/143
(58) Field of Classification Search ................ 361/139, 361/144, 146, 153, 154, 143; 73/159, 704; 242/419.3; 226/10, 15, 45
See application file for complete search history.

(56) References Cited

U.S. PATENT DOCUMENTS

| | | | | |
|---|---|---|---|---|
| 3,784,072 A | * | 1/1974 | Armstrong et al. | 226/1 |
| 4,309,902 A | * | 1/1982 | Sano et al. | 73/159 |
| 4,655,166 A | | 4/1987 | Nishimura et al. | |
| 4,848,630 A | * | 7/1989 | Niestrath et al. | 226/4 |
| 5,678,447 A | * | 10/1997 | Graff | 73/159 |
| 5,810,120 A | * | 9/1998 | Jamieson et al. | 187/292 |
| 6,192,564 B1 | * | 2/2001 | Katsura et al. | 29/33 A |
| 6,471,153 B1 | * | 10/2002 | Kimura et al. | 242/419.3 |

FOREIGN PATENT DOCUMENTS

| | | |
|---|---|---|
| DE | 41 18975 A1 | 12/1992 |
| GB | 2 066 786 A | 7/1981 |
| WO | 00/71977 A1 | 11/2000 |

\* cited by examiner

*Primary Examiner*—Brian Sircus
*Assistant Examiner*—Danny Nguyen
(74) *Attorney, Agent, or Firm*—Dykema Gossett PLLC

(57) ABSTRACT

A device and a method for stabilising a metallic object of magnetic material. The metallic object is transported along a transportation path or plane. The plane includes a transportation direction and is parallel to the longitudinal direction of the object therein. A sensor is arranged to sense the valve of a parameter depending on the position of the object with respect to the plane. An electromagnetic actuator is arranged to apply a magnetic force to the object in respone to the sensed position. The magnetic force has a force component directed transversely to the transportation direction and transversely to the plane.

15 Claims, 2 Drawing Sheets

FIG 2
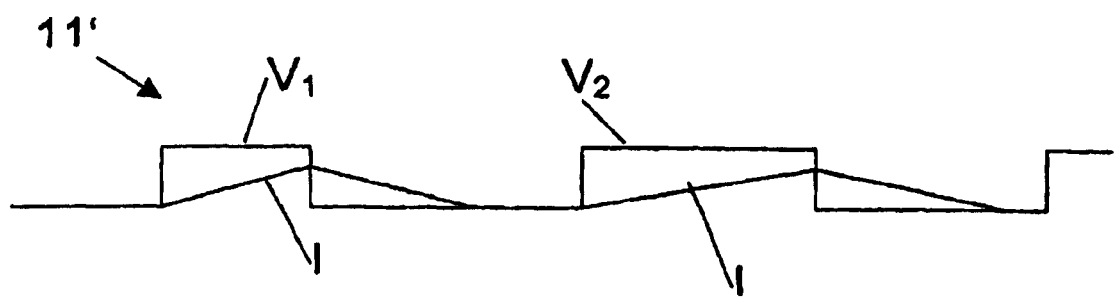
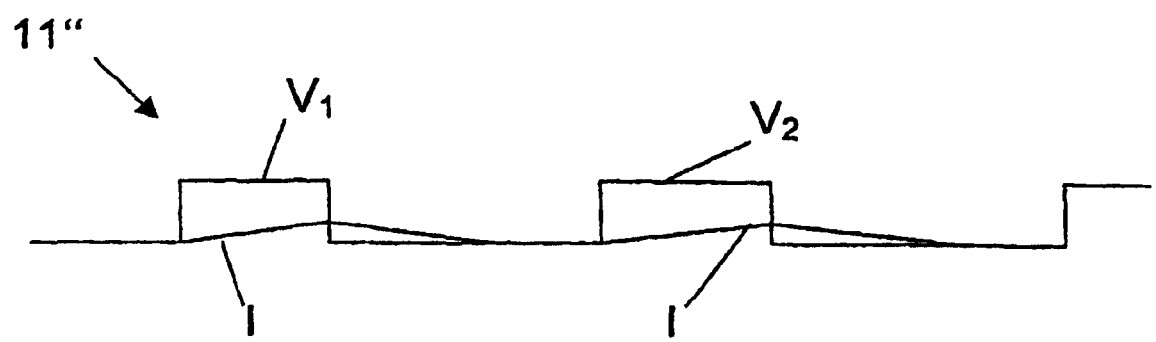

DEVICE AND A METHOD FOR STABILIZING A WEB OR A FILAMENT OF FERROMAGNETIC MATERIAL MOVING IN ONE DIRECTION

BACKGROUND OF THE INVENTION AND PRIOR ART

The present invention refers to a device for stabilising an elongated metallic object of magnetic material, the metallic object being intended to be transported along a transportation path located in a plane, which includes a transportation direction and is substantially parallel to the longitudinal direction of the object in said path. Moreover, the invention refers to a method for stabilising an elongated metallic object of magnetic material, wherein the metallic object is transported along a transportation path located in a plane, which includes a transportation direction and is substantially parallel to the longitudinal direction of the object in said path.

In different industries, there is a need to transport continuously elongated metallic objects, such as metallic strips or wires in rolling mills, in different metal coating applications, such as continuous galvanising of steel strips or steel wires, continuous casting, extrusion etc. During such continuous transportation, a portion of the object is extended in a plane and transported in a longitudinal direction of the object in said plane. For efficiency reasons, it is important to obtain a high transportation speed. However, a high transportation speed can result in problems to keep the object stable in the plane, i.e. to maintain the position of the object with respect to the plane and prevent transversal deflections of the object.

U.S. Pat. No. 4,655,166 discloses an apparatus for preventing oscillations of a running strip in connection with galvanising of the strip. The apparatus comprises permanent magnet units arranged in the vicinity of the two opposite side edges of the running strip. Detectors are provided to detect the gap between the side edges and the respective magnet unit. In order to maintain the size of the gap at determined level, control motors are provided to adjust the position of the magnet units in response to the detected gap.

U.S. Pat. No. 3,661,116 discloses a similar device for stabilising a metal strip. An electromagnet extends along a path in such a way that the poles are arranged outside and in the vicinity of a respective side edge of the strip.

SUMMARY OF THE INVENTION

The object of the invention is to improve the stabilisation of a metallic object during transportation, in particular during transportation at a high transportation speed.

This object is obtained by the device initially defined, which is characterised in that it includes a sensor arranged to sense the value of parameter depending on the position of the object with respect to the plane and a substantially stationary electromagnetic actuator arranged to apply a magnetic force to the object in response to the sensed position, wherein the magnetic force includes at least a force component directed transversely to the transportation direction and transversely to the plane.

By such device it is possible to obtain a proper positioning of the object with respect to the plane so that the object runs along the plane in a stable manner. Moreover, since the actuator enables correction of the transversal position of the object with respect to the plane by a magnetic force, no contacting of the object is required.

According to an embodiment of the invention, the actuator includes at least a first actuating member arranged on a first side of the plane and at a determined distance from the plane. Furthermore, the actuator may also include a second actuating member arranged on a second side of the plane and at a determined distance from the plane. Thus, the actuator defines said plane between the first actuating member and the second actuating member. Preferably, the first actuating member may be arranged at the same distance from the plane as the second actuating member but on the opposite side thereof.

According to a further embodiment of the invention the first actuating member is positioned essentially exactly opposite to the second actuating member. Preferably, the first actuating member may be substantially identical to the second actuating member. By such a symmetric arrangement of the actuating members with respect to the plane, both the sensing function and the control function may be achieved in an easy manner.

According to a further embodiment of the invention, the actuator is arranged to increase the magnetic force of one of the actuating members when the position of the object deviates from said plane.

According to a further embodiment of the invention, said actuating member includes a magnetic flux carrier forming a magnetic flux circuit with a part of the object. Said magnetic flux carrier may have a first end arranged to be located in the proximity of the object and a second end arranged to be located in the proximity of the object, wherein said part of the object extends substantially between the first end and the second end. Such a magnetic flux carrier may be made of any suitable magnetic material, such iron plates, magnetic powder etc., and may be shaped as loop extending between the first end and the second end, said ends forming magnetic poles of said actuating member.

According to a further embodiment of the invention, the device includes a control unit arranged to apply voltage pulses to the actuator in response to said sensed value, thereby generating said magnetic force. Said actuating member may include a winding connected to said control unit, wherein the control unit is arranged to apply said voltage pulses to the winding to induce a magnetic flux in the magnetic flux carrier. Preferably, the control unit is arranged to apply said voltage pulses having a substantially constant amplitude, and thereby to vary the magnetic force by varying the length of the voltage pulses.

According to a further embodiment of the invention the sensor is arranged to sense the level of the electric current through the winding. Such as sensor is not in contact with the object and the sensing function will not influence the position of the object. Moreover, by such a sensor the winding may involve both the actuating function and the sensing function.

According to a further embodiment of the invention, the control unit is arranged to increase the magnetic force applied by said actuating member when the level of the electric current through the corresponding winding increases. Thereby, the sensor may include a first sensor member arranged to sense the level of the current through the first actuating member and a second sensor member arranged to sense the level of the current through the second current member, wherein the control unit is arrange to compare the current level through the first actuating member with the current level through the second actuating member and to increase the length of the voltage pulses through the winding of the actuating member having the highest current level.

According to a further embodiment of the invention, the control unit includes a so-called DC-chopper.

The object is also obtained by the method initially defined, which is characterised by the steps of:

sensing the value of parameter depending on the position of the object with respect to the plane, and applying a magnetic force to the object in response to the sensed value, wherein the magnetic force includes at least a force component, acting on the object and directed transversely to the transportation direction and transversely to the plane.

BRIEF DESCRIPTION OF THE DRAWINGS

The present invention will now be explained in more detail with reference to different embodiments, disclosed by way of example only, and with reference to the figures attached.

FIG. 2 is a diagram disclosing the current through a winding of a respective actuating member in response to voltage pulses.

DETAILED DESCRIPTION OF VARIOUS EMBODIMENTS OF THE INVENTION

Figure 1:
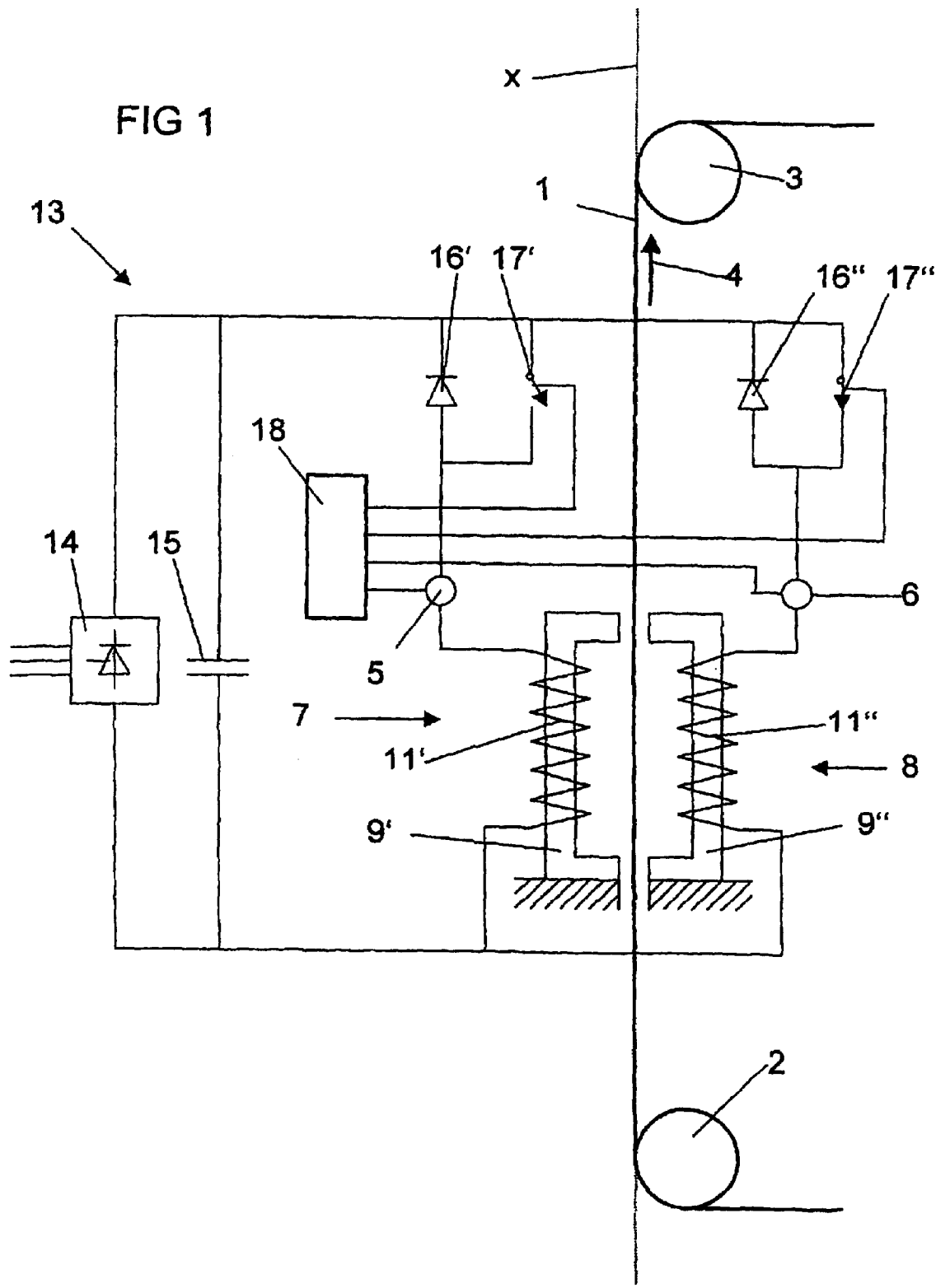
FIG. 1 discloses schematically a device for stabilising a metallic object according to the invention.

FIG. 1 discloses a device for stabilising a running elongated metallic object 1 of magnetic material. In the embodiment disclosed the object is a metal strip 1. It is to be noted, however, that the invention also is applicable to other elongated objects such as different bands, wires, pipes etc. In the embodiment disclosed the metal strip 1 is transported or substantially continuously moved from a first roll 2 to a second roll 3 along a transportation path located in a plane x. In FIG. 1 the plane x is substantially vertical. However, the plane x and the transportation path may extend in other directions than a vertical one, for instance in a horizontal direction.

It should be noted that the rolls 2, 3 are schematically indicated to substantiate the transportation path. Such a transportation path can form a part of many different industrial processes, for instance galvanising of steel strips, rolling mill processes, extrusion etc.

The device according to the invention includes a sensor arranged to sense the value of a parameter depending on the position of the metal strip 1 with respect to the plane x, or in other words depending on the distances of the metal strip 1 from the plane x. The sensor includes a first sensor member 5 and a second sensor member 6. Each sensor member 5, 6 is arranged to sense a current level. The sensor members 5, 6 are to be described more closely below.

Furthermore, the device includes a substantially stationary electromagnetic actuator arranged to apply a magnetic force to the metal strip 1 in response to said sensed value. The electromagnetic actuator includes a first substantial stationary actuating member 7, which is arranged on a first side of the plane x and at a determined distance from the plane x, and thus from the running metal strip 1. The actuator also includes a second substantial stationary actuating member 8, which is arranged on a second side of the plane x and at a determined distance from the plane x, and thus from the metal strip 1. Each actuating member 7, 8 includes a magnetic flux carrier in the form of a core 9', 9" of iron or any suitable magnetic material, such as iron plates, magnetic iron powder etc. Each core 9', 9" is formed as a loop extending between a first end and a second end, wherein said ends form two magnetic poles of the respective actuating member 7, 8. Furthermore, each actuating member 7, 8 includes an electric winding 11', 11" which is wound around a respective core 9', 9". Consequently, a voltage applied to the winding 11', 11" will induce a magnetic flux in the core 9', 9" and a substantially closed magnetic flux circuit is obtained by the core 9', 9' and a part of the metal strip 1, which part extends between the two magnetic holes of the respective core 9', 9".

In the embodiment disclosed, the first actuating member 7 is positioned substantially exactly opposite to the second actuating member 8. Moreover, the first actuating member 7 is substantially identical to the second actuating member 8, and the two actuating members 7, 8 are positioned at the same distance from the plane x and thus from the metal strip 1, when the metal strip 1 is located in the intended transportation path. Thus, the plane x font a middle plane x between the actuating 7, 8.

The device according to the invention also includes a control unit 13 arranged to apply voltage pulses to the windings 11', 11" of the first actuating member 7 and the second actuating member 8, respectively, in response to the values sensed by the first sensor member 5 and the second sensor member 6, respectively.

The control unit 13 form a so-called DC-chopper and includes a line rectifier 14 to be supplied with a three-phase AC-voltage. In parallel to the rectifier 14 a capacitance 15 is provided. The windings 11', 11" are also connected in parallel to the rectifier 14 via the respective sensor member 5, 6 and a switching device represented by an anti-parallel diode 16', 16" and a one-way current switch 17', 17" (the filled arrows indicate the current direction). Furthermore, the control unit 13 includes a processor 18 which is connected to the first sensor member 5, the second sensor member 6, the switch 17' and the switch 17".

The first sensor member 5 and the second sensor member 6 are arranged to sense the current level through the respective winding 11' and 11". The processor 18 is connected to the sensor members 5 and 6 and arranged to receive the sensed level from the sensor members 5, 6. Furthermore, the processor 18 is connected to the switches 17' and 17" and arranged to initiating switching of the switches 17', 17" between an open state, see switch 17', and a closed state, see switch 17". By closing the switch 17', 17" a voltage will be applied to the respective winding 11', 11". Consequently, the processor 18 will apply voltage pulses V to the actuating members 7, 8 of a certain length T, see FIG. 2. The voltage pulses induces a current in the respective winding 11', 11", and by means of the sensor members 5, 6 the current level through the windings 11', 11" is measured. The current level through the windings 11', 11" depends on the magnetic inductance of the respective magnetic flux circuit. If the distance between the metal strip 1 and the ends of the core 9', 9" increases, the magnetic inductance of the magnetic flux circuit decreases, which means that the current through the winding 11', 11" will increase since the magnetic inductance of the magnetic flux circuit is reciprocally proportional to the current through the winding 11', 11".

FIG. 2 indicates the voltage pulses V and the current I with respect to the windings 11' and 11". In the winding 11' the current I is at a higher level for the voltage pulse $V_1$, which means that the metal strip 1 is positioned closer to the second actuating member 8 than the first actuating member 7. To compensate for this, the second voltage pulse $V_2$ is prolonged so that the first actuating member 7 will apply an attracting magnetic force on the metal strip 1 during a longer period of time than the second actuating member 8, and consequently, the metal strip 1 will be forced to the position of the middle plane x.

The present invention is not limited to the embodiments disclosed by may be varied and modified within the scope of the following claims.

The invention claimed is:

1. A device for stabilizing an elongated metallic object of magnetic material, the metallic object being intended to be transported along a transportation path located in a plane (x), which includes a transportation direction and is substantially parallel to the longitudinal direction of the object in said path, comprising:
    a substantially stationary electromagnetic actuator arranged to apply a selected magnetic force to the object in response to a corresponding level of current, said actuator including at least a first actuating member having a winding for carrying the current arranged on a first side of the plane and at a selected distance from the plane,
    a sensor responsively coupled to the winding of the actuation member for sensing the level of the current through the winding depending an the position of the object with respect to the plane, wherein the substantially stationary electromagnetic actuator is arranged to apply the magnetic force to the object in response to the level of current sensed by the sensor, and wherein the magnetic force includes at least a force component, acting on the object and directed transversely to the transportation direction and transversely to the plane; and
    a control unit arranged to apply voltage pulses to the actuator in response to said sensed value, thereby generating said magnetic force.

2. A device according to claim 1, wherein the first actuating member is positioned essentially exactly opposite to the second actuating member.

3. A device according to claim 1, the first actuating member is substantially identical to the second actuating member.

4. A device according to claim 1, wherein the actuator is arranged to increase the magnetic force of one of the actuating members when the position of the object deviates from said plane.

5. A device according to claim 1, wherein said actuating member includes a magnetic flux carrier forming a magnetic flux circuit with a part of the object.

6. A device according to claim 5, wherein said magnetic flux carrier has a first end arranged to be located in the proximity of the object and a second end arranged to be located in the proximity of the object, wherein said part of the object extends substantially between the first end and the second end.

7. A device according to claim 1, wherein said actuating member includes a winding connected to said control unit, wherein the control unit is arranged to apply said voltage pulses to the winding.

8. A device according to claim 7, wherein the control unit is arranged to apply said voltage pulses having a substantially constant amplitude.

9. A device according to claim 7, wherein the control unit is arranged to vary the magnetic force by varying the length of the voltage pulses.

10. A device according to claim 7, wherein the control unit is arranged to increase the magnetic force applied by said actuating member when the level of the current through the corresponding winding increases.

11. A device according to claim 10, wherein the sensor includes a first sensor member arranged to sense the level of the current through the first actuating member and a second sensor member arranged to sense the level of the current through the second actuating member, wherein the control unit is arranged to compare the current level through the first actuating member with the current level through the second actuating member and to increase the length of the voltage pulses through the winding of the actuating member having the highest current level.

12. A device according to claim 1, wherein said control unit includes a so-called DC-chopper.

13. A device according to claim 7, wherein the control unit is arranged to apply said voltage pulses having a substantially constant amplitude.

14. A method for stabilising an elongated metallic object of magnetic material with a substantially stationary electromagnetic actuator arranged to apply a magnetic force to the object, wherein the metallic object is transported along a transportation path located in a plane which includes a transportation direction and is substantially parallel to the longitudinal direction of the object in said path, and wherein the actuator includes at least a first actuating member which includes a winding and is arranged on a first side of the plane and at a selected distance from the plane and a second actuating member which includes a winding arranged on a second side of the plane and at a selected distance from the plane, and a control unit, comprising the steps of:
    sensing the level of the electric current through each said winding, the level depending on the position of the object with respect to the plane;
    applying voltage pulses from the control unit to the first and second actuator means to produce the magnetic force; and
    applying the magnetic force from the first and second actuator means to the object in response to the sensed value, wherein the magnetic force includes at least a force component, acting on the object and directed transversely to the transportation direction and transversely to the plane.

15. A device for stabilizing an elongated metallic object of magnetic material, the object being intended to be transported along a transport path located in a plane, which includes a transport direction substantially parallel to the longitudinal direction of the object in said path, comprising:
    an electromagnetic actuator arranged to apply a selected magnetic force to the object in response to a corresponding level of current, said actuator being located adjacent the transport path in a stationary position relative to the object, said actuator including a first actuating member having a winding for carrying the current arranged on a first side of the plane and at a selected distance from the plane,
    a sensor responsively coupled to the winding of the actuation member for sensing the level of current through the winding depending on the position of the object with respect to the plane, wherein the actuator is arranged to apply the magnetic force to the object in response to the level of current sensed by the sensor, and wherein the magnetic force includes a force component, acting on the object and directed transversely to the transport direction and transversely to the plane; and
    a control unit arranged to apply voltage pulses to the actuator in response to said sensed value, thereby generating said magnetic force.

* * * * *